(12) United States Patent
Todaka et al.

(10) Patent No.: US 11,035,780 B2
(45) Date of Patent: Jun. 15, 2021

(54) COVER FILM FOR TESTING, TESTING MEMBER, AND METHOD OF MANUFACTURING COVER FILM FOR TESTING

(71) Applicant: LINTEC CORPORATION, Tokyo (JP)

(72) Inventors: Masaya Todaka, Tokyo (JP); Hiroki Hoshino, Tokyo (JP); Tomoo Orui, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 0 days.

(21) Appl. No.: 16/877,961

(22) Filed: May 19, 2020

(65) Prior Publication Data

US 2020/0278287 A1 Sep. 3, 2020

Related U.S. Application Data

(62) Division of application No. 15/831,758, filed on Dec. 5, 2017, now Pat. No. 10,697,886.

(30) Foreign Application Priority Data

Dec. 22, 2016 (JP) .............................. JP2016-250109

(51) Int. Cl.
*G01N 21/03* (2006.01)
*B01L 3/00* (2006.01)
*G01N 21/51* (2006.01)

(52) U.S. Cl.
CPC .......... *G01N 21/03* (2013.01); *B01L 3/50853* (2013.01); *B01L 3/502707* (2013.01);
(Continued)

(58) Field of Classification Search
CPC ............. G01N 21/03; G01N 2021/513; G01N 2021/0382; G01N 2021/0357;
(Continued)

(56) References Cited

U.S. PATENT DOCUMENTS 3,551,023 A 12/1970 Brackett
4,849,340 A 7/1989 Oberhardt
(Continued)

FOREIGN PATENT DOCUMENTS

JP 2004-061319 A 2/2004
JP 2006-030160 A 2/2006
(Continued)

OTHER PUBLICATIONS

Office Action dated Aug. 18, 2020 issued in corresponding JP application No. 2016-250109 (and English translation).
(Continued)

*Primary Examiner* — Michael P LaPage
(74) *Attorney, Agent, or Firm* — Posz Law Group, PLC (57) ABSTRACT

[Problems] Objects include providing a cover film for testing which can be well fixed to a substrate having a groove and in which a pressure sensitive adhesive does not invade into the groove, providing a testing member comprising the cover film for testing, and providing a method of manufacturing the cover film for testing.
[Solution] The cover film for testing (1, 2) comprises a base material (10) and a pressure sensitive adhesive layer (20) laminated on one surface side of the base material (10). The cover film for testing (1, 2) has a region in which the pressure sensitive adhesive layer (20) does not exist in the plan view.

11 Claims, 4 Drawing Sheets

(52) U.S. Cl.
CPC . *B01L 2200/0689* (2013.01); *B01L 2300/044* (2013.01); *B01L 2300/0816* (2013.01); *B01L 2300/0887* (2013.01); *B01L 2300/12* (2013.01); *G01N 2021/0357* (2013.01); *G01N 2021/0382* (2013.01); *G01N 2021/513* (2013.01)

(58) Field of Classification Search
CPC ........... B01L 3/50853; B01L 3/502707; B01L 2300/0887; B01L 2200/0689; B01L 2300/044; B01L 2300/12; B01L 2300/0816
See application file for complete search history.

(56) References Cited

U.S. PATENT DOCUMENTS

| | | | |
|---|---|---|---|
| 4,902,624 | A | 2/1990 | Columbus et al. |
| 8,339,601 | B2 | 12/2012 | Weichselbaum et al. |
| 10,464,284 | B2 | 11/2019 | Hoshino et al. |
| 2002/0145960 | A1 | 10/2002 | Worthington et al. |
| 2003/0214650 | A1 | 11/2003 | Dietz et al. |
| 2010/0028207 | A1 | 2/2010 | Colella et al. |
| 2012/0195810 | A1* | 8/2012 | Cohen .................. B01L 3/5027 422/502 |
| 2012/0295781 | A1 | 11/2012 | Amasia et al. |
| 2013/0120747 | A1 | 5/2013 | Chan et al. |
| 2013/0176556 | A1 | 7/2013 | Larkin et al. |
| 2014/0273188 | A1 | 9/2014 | Mohan et al. |
| 2014/0377852 | A1 | 12/2014 | Putnam et al. |
| 2015/0108010 | A1 | 4/2015 | Ross et al. |
| 2015/0328633 | A1* | 11/2015 | Yoo .................. B01L 3/502715 435/6.12 |
| 2015/0334836 | A1 | 11/2015 | Karavakis et al. |
| 2017/0352570 | A1 | 12/2017 | Hara et al. |
| 2018/0292308 | A1 | 10/2018 | Hoshino et al. |
| 2019/0211232 | A1 | 7/2019 | Hu |

FOREIGN PATENT DOCUMENTS

| | | |
|---|---|---|
| JP | 2006-510384 A | 3/2006 |
| JP | 2008-8880 A | 1/2008 |
| JP | 2008-157644 A | 7/2008 |
| WO | 2004/058405 A1 | 7/2004 |
| WO | 2010/101044 A1 | 9/2010 |
| WO | 2016/084767 A1 | 6/2016 |

OTHER PUBLICATIONS

Office Action dated Feb. 24, 2021 issued in corresponding JP patent application No. 2016-250109 (and English translation).

* cited by examiner

COVER FILM FOR TESTING, TESTING MEMBER, AND METHOD OF MANUFACTURING COVER FILM FOR TESTING

CROSS REFERENCE TO RELATED APPLICATIONS

This application is a divisional of U.S. patent application Ser. No. 15/831,758 filed on Dec. 5, 2017, which is based on and claims priority to Japanese Patent Application No. 2016-250109 filed on Dec. 22, 2016, the disclosures of which are incorporated herein by reference.

TECHNICAL FIELD

The present invention relates to a testing member used for optically testing a specimen, a cover film for testing used therein, and a method of manufacturing the cover film for testing.

BACKGROUND ART

A method of optically testing a specimen exists for the purpose of measuring the turbidity of a specimen such as liquid, the amount of a specific component in the specimen, and other items. In such an optical testing method, the specimen is irradiated with light to measure light that is caused by the irradiation. More specific examples of such a testing method include a method of irradiating a specimen with light and measuring the degree of scattering of the light, a method of measuring an amount of absorption of light by a component in a specimen when the specimen is irradiated with light and the light transmits through the specimen, and a method of measuring fluorescence caused in a specimen. In such a testing method, conventionally, the specimen has been stored in a test tube or cell having an appropriate volume, such as several milliliters.

In recent years, a testing method is developed which uses a testing member provided with a fine groove for storing a specimen, as substitute for the above test tube or cell. In such a method, the test is possible even for a small amount of the specimen and thus requires only a slight amount of the specimen. Moreover, the use of a testing member having a plurality of grooves enables collective measurement and a number of specimens can therefore be tested at the same time.

Patent Literature 1 discloses a multi-layered composite structure as an example of the above-described testing member having fine grooves. The multi-layered composite structure comprises a base material that constitutes side surfaces of the grooves, a first layer that constitutes bottom surfaces of the grooves, and a resealable film as a cover that covers the grooves (paragraph 0032 and FIG. 2 of Patent Literature 1). Patent Literature 2 discloses a plastic microchip in which a plastic substrate that has a fine flow channel as the above groove at the surface and a plastic film as a cover that covers the groove are bonded together via an adhesive (Claim 1 of Patent Literature 2).

PRIOR ART LITERATURE

Patent Literature

[Patent Literature 1] JP2006-510384A
[Patent Literature 2] JP2008-157644A

SUMMARY OF THE INVENTION

Problems to be Solved by the Invention

As installed in the testing members described in Patent Literature 1 and Patent Literature 2, the grooves may be covered by a cover to prevent troubles, such as vaporization and leakage of specimens and pollution of specimens. Such a cover has to be well fixed to the substrate in order to prevent its delamination and dropping from the substrate provided with the grooves. Such a cover may therefore be fixed to the substrate using an adhesive or pressure sensitive adhesive. For example, in Patent Literature 2, the plastic film is adhered using an adhesive to the surface of the plastic substrate having the fine flow channel.

In the conventional fixing method as disclosed in Patent Literature 2, however, the adhesive or pressure sensitive adhesive used may invade into the groove and/or fill the groove. In this case, the test cannot be well performed because the specimen cannot be sufficiently stored in the groove.

The present invention has been made in consideration of such actual circumstances and an object of the present invention is to provide a cover film for testing which can be well fixed to a substrate having a groove and in which a pressure sensitive adhesive does not invade into the groove. Another object of the present invention is to provide a testing member comprising the cover film for testing. A further object of the present invention is to provide a method of manufacturing the cover film for testing.

Means for Solving the Problems

To achieve the above objects, first, the present invention provides a cover film for testing comprising: a base material: and a pressure sensitive adhesive layer laminated on one surface side of the base material, the cover film for testing having a region in which the pressure sensitive adhesive layer does not exist in a plan view (Invention 1).

The cover film for testing according to the above invention (Invention 1) includes the pressure sensitive adhesive layer and can thereby be well fixed to the substrate. Moreover, the cover film for testing has the region in which the pressure sensitive adhesive layer does not exist in the plan view, and the region can thereby be overlapped with the groove of the substrate in the plan view when a testing member is constituted. This can prevent invasion into the groove of the substrate of a pressure sensitive adhesive that constitutes the pressure sensitive adhesive layer. As a result of these, the use of the cover film for testing allows a testing member to be obtained with which the test can be well performed.

In the above invention (Invention 1), in a surface of the cover film for testing at the pressure sensitive adhesive layer side, an arithmetic average roughness (Ra) of the region in which the pressure sensitive adhesive layer does not exist may preferably be 0.1 nm or more and 200 nm or less (Invention 2).

In the above invention (Invention 1), the base material may preferably have transparency to light used in a test (Invention 3).

In the above invention (Invention 1), the base material may preferably have a thickness of 30 μm or more and 300 μm or less (Invention 4).

In the above invention (Invention 1), the cover film for testing may preferably further comprise a laser etching resistant layer laminated on a surface of the base material at the pressure sensitive adhesive layer side (Invention 5).

Second, the present invention provides a testing member comprising: a substrate having a surface provided with at least one groove; and a cover film laminated on the surface of the substrate provided with the groove, the cover film being the above cover film for testing (Invention 1), the testing member being for performing an optical test for a specimen stored in the groove (Invention 6).

In the above invention (Invention 6), in the cover film for testing, the region in which the pressure sensitive adhesive layer does not exist in the plan view may preferably overlap with the groove of the substrate in the plan view (Invention 7).

In the above invention (Invention 6), the substrate may preferably have transparency to light used in the test (Invention 8).

Third, the present invention provides a method of manufacturing the above cover film for testing (Invention 1), the method comprising: a step of laminating a pressure sensitive adhesive on one surface of the base material; and a step of removing at least a part of the pressure sensitive adhesive by laser etching to form the pressure sensitive adhesive layer, the part of the pressure sensitive adhesive being located in a region that overlaps with the groove in the plan view when the above testing member (Invention 6) is constituted (Invention 9).

Fourth, the present invention provides a method of manufacturing the above cover film for testing (Invention 1), the method comprising a step of printing a pressure sensitive adhesive on the one surface side of the base material to form the pressure sensitive adhesive layer (Invention 10).

Advantageous Effect of the Invention

The cover film for testing of the present invention can be well fixed to the substrate having the groove and the pressure sensitive adhesive does not invade into the groove. Moreover, the cover film for testing of the present invention can be used to well perform the test. Furthermore, according to the method of manufacturing a cover film for testing of the present invention, the cover film for testing as the above can be manufactured.

EMBODIMENTS FOR CARRYING OUT THE INVENTION

Figure 1:
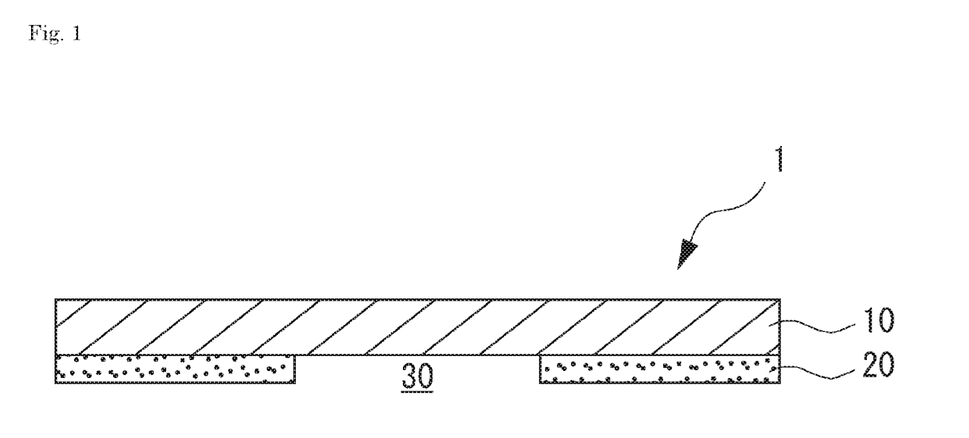
FIG. 1 is a cross-sectional view of a cover film for testing according to a first embodiment of the present invention.

Hereinafter, embodiments of the present invention will be described.
<Cover Film for Testing>
FIG. 1 illustrates a cover film for testing 1 according to the first embodiment. The cover film for testing 1 comprises a base material 10 and a pressure sensitive adhesive layer 20 that is laminated on one surface side of the base material 10.

Figure 2:
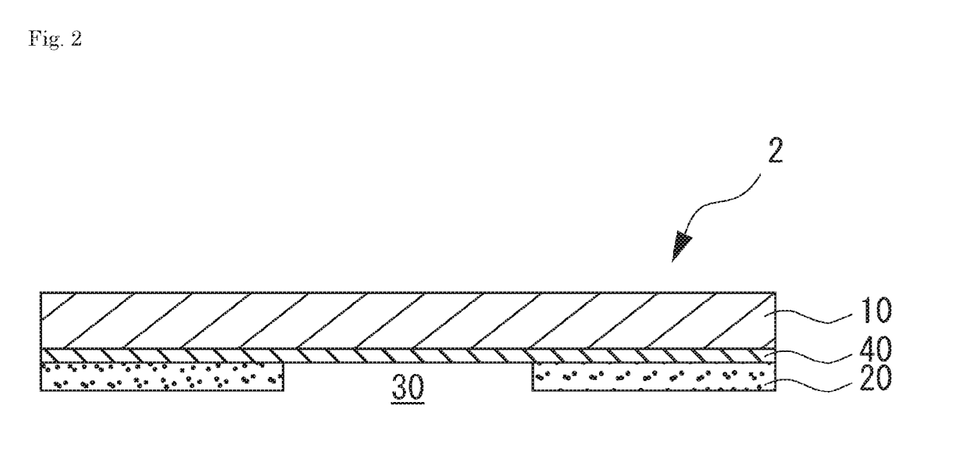
FIG. 2 is a cross-sectional view of a testing member according to a second embodiment of the present invention.

FIG. 2 illustrates a cover film for testing 2 according to the second embodiment. The cover film for testing 2 comprises a base material 10, a laser etching resistant layer 40 that is laminated on one surface side of the base material 10, and a pressure sensitive adhesive layer 20 that is laminated on the surface of the laser etching resistant layer 40 opposite to the base material 10.

The cover film for testing 1, 2 according to the present embodiment has a region in which the pressure sensitive adhesive layer 20 does not exist in the plan view. FIG. 1 and FIG. 2 each illustrate a pressure sensitive adhesive absent region 30 as the region in which the pressure sensitive adhesive layer 20 does not exist as the above.

Figure 5:
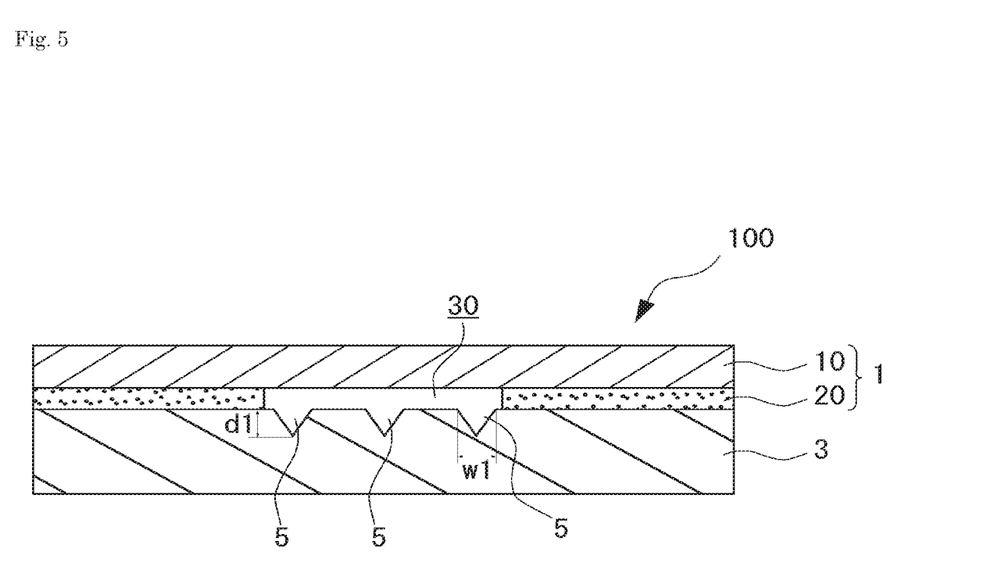
FIG. 5 is a cross-sectional view of a testing member according to an embodiment of the present invention.

The cover film for testing 1, 2 according to the present embodiment may be for constituting a testing member used in a test and may preferably be for constituting a testing member 100 as illustrated in FIG. 5. The testing member 100 comprises a substrate 3 having a surface provided with at least one groove 5 and the cover film for testing 1, 2 laminated on the surface of the substrate 3 provided with the grooves 5 and may be for performing an optical test for a specimen stored in each groove 5.

In the cover film for testing 1, 2 according to the present embodiment, the pressure sensitive adhesive layer 20 can be used to attach the substrate 3 and the base material 10 to each other and the cover film for testing 1, 2 can therefore be well fixed to the substrate 3. On the other hand, in the cover film for testing 1, 2 according to the present embodiment, when the testing member 100 is constituted, the pressure sensitive adhesive absent region 30 can be overlapped with the grooves 5 of the substrate 3 in the plan view. In the testing member 100 thus obtained, the pressure sensitive adhesive which constitutes the pressure sensitive adhesive layer 20 does not overlap with the grooves 5 present on the substrate 3 in the plan view. This can avoid the pressure sensitive adhesive from invading into the grooves 5 or filling the grooves 5. As the above, the cover film for testing 1, 2 according to the present embodiment can be used to obtain the testing member 100 with which the test can be well performed.

In the cover film for testing 1, 2 according to the present embodiment, the arrangement of the pressure sensitive adhesive layer 20 and the pressure sensitive adhesive absent region 30 can be appropriately set in accordance with the positions of the grooves 5 of the substrate 3 on which the cover film for testing 1, 2 is laminated. In particular, when the cover film for testing 1, 2 according to the present embodiment is laminated on the substrate 3 as illustrated in FIG. 5, it suffices that the pressure sensitive adhesive layer 20 of the cover film for testing 1, 2 does not exist at least in a region that overlaps with the grooves 5 in the plan view when the testing member 100 is constituted. In other words, the location of the pressure sensitive adhesive absent region 30 may extend into a region that does not overlap with the grooves 5 in the plan view when the testing member 100 is constituted.

1. Configuration of Cover Film for Testing
(1) Base Material
In the cover film for testing 1, 2 according to the present embodiment, the configuration of the base material 10 is not particularly limited, provided that the test can be performed using the testing member 100 which includes the base material 10. From the viewpoint of enabling a good test, it may be preferred for the base material 10 to have transparency to light used in the test (which may be referred to "testing light," hereinafter).

As a material of the base material 10, a resin film, glass, and other appropriate material can be used, among which the resin film may preferably be used from the viewpoint of easy production and easy handling. Examples of the resin film include a polycarbonate film, films of polyester, such as polyethylene terephthalate, polybutylene terephthalate and polyethylene naphthalate, films of polyolefin, such as polyethylene and polypropylene, cellophane, a diacetyl cellulose film, triacetyl cellulose film, acetyl cellulose butyrate film, polyvinyl chloride film, polyvinylidene chloride film, polyvinyl alcohol film, ethylene-vinyl acetate copolymer film, polystyrene film, polymethylpentene film, polysulfone film, polyether ether ketone film, polyether sulfone film, polyetherimide film, polyimide film, fluorine resin film, polyamide film, acrylic resin film, norbornene-based resin film, cycloolefin resin film, polyphenylene sulfide film, and liquid-crystal polymer film. These films may be in a single layer or may also be in a multilayer obtained by laminating two or more layers of the same type or different types.

Among the above resin films, the polycarbonate film, polyethylene terephthalate film, polybutylene terephthalate film, cycloolefin resin film, or acrylic resin film may preferably be used and the polycarbonate film may be particularly preferably used from the viewpoint of excellent transparency to the testing light. Details of the testing light will be described later.

The same material as that of the substrate 3 may preferably be used as a material of the base material 10. The use of the same material can reduce the difference in the transparency to the testing light between the base material 10 and the substrate 3 and the influence of such a difference on the measurement can be reduced.

The arithmetic average roughness (Ra) of both surfaces of the base material 10 may be preferably 200 nm or less, particularly preferably 100 nm or less, and further preferably 50 nm or less. The arithmetic average roughness (Ra) being 200 nm or less can suppress the diffuse reflection of the testing light at the surfaces of the base material 10 and the base material 10 may readily have excellent transparency to the testing light. Moreover, the arithmetic average roughness (Ra) of the region (pressure sensitive adhesive absent region 30), in which the pressure sensitive adhesive layer 20 does not exist, on the surface of the cover film for testing 1, 2 at the pressure sensitive adhesive layer 20 side may readily be adjusted within a range which will be described later. As a result of these, the obtained testing member 100 can have improved accuracy in the test. The lower limit of the above arithmetic average roughness (Ra) is not particularly limited, but in general may be preferably 0.1 nm or more, particularly preferably 0.5 nm or more, and further preferably 1 nm or more.

In the cover film for testing 1, 2 according to the present embodiment, the transmittance of the testing light through the base material 10 may be preferably 60% or higher, particularly preferably 80% or higher, and further preferably 90% or higher. The above transmittance being 60% or higher allows the cover film for testing 1, 2 to have better transparency to the testing light. As a result, in the testing member 100 obtained using the cover film for testing 1, 2, the testing can be more accurately performed. The upper limit of the above transmittance is not particularly limited and may be 100% or lower.

In the cover film for testing 1, 2 according to the present embodiment, the haze value of the base material 10 may be preferably 10% or less, particularly preferably 5% or less, and further preferably 1% or less. The haze value of the base material 10 being 10% or less can effectively reduce the scattering of the testing light in the base material 10. In the testing member 100 obtained using the cover film for testing 1, 2, therefore, the testing can be more accurately performed. The lower limit of the haze value of the base material 10 is not particularly limited, but may ordinarily be 0% or more. The haze value as used in the present description refers to a value that is measured in accordance with JIS K7136: 2000.

For the purpose of improving the interfacial adhesion of the base material 10 with the pressure sensitive adhesive layer 20, the base material 10 can be subjected to surface treatment, such as using an oxidation method and roughening method, or primer treatment, provided that the transparency to the testing light is not impaired. Examples of the above oxidation method include corona discharge treatment, plasma discharge treatment, chromium oxidation treatment (wet type), flame treatment, hot-air treatment, ozone exposure treatment, and ultraviolet ray irradiation treatment. Examples of the roughening method include a sandblast method and thermal spraying method. These surface treatment methods may be appropriately selected in accordance with the type of the material which constitutes the base material 10.

The thickness of the base material 10 may be preferably 30 μm or more, particularly preferably 50 μm or more, and further preferably 75 μm or more. The thickness may be preferably 300 μm or less, particularly preferably 200 μm or less, and further preferably 150 μm or less. The thickness of the base material 10 being 30 μm or more allows the base material 10 to have sufficient strength to improve the handling ability and it is possible to suppress the deformation and breakage of the base material 10 when the testing member 100 is used. The thickness of the base material 10 being 300 μm or less allows the base material 10 to readily have excellent transparency to the testing light and the test may be well performed in the obtained testing member 100.

(2) Pressure Sensitive Adhesive Layer

In the cover film for testing 1, 2 according to the present embodiment, the pressure sensitive adhesive which constitutes the pressure sensitive adhesive layer 20 is not particularly limited, provided that the pressure sensitive adhesive can well fix the cover film for testing 1, 2 to the substrate 3 and does not adversely affect the test.

Specific examples of the above pressure sensitive adhesive include a silicone-based pressure sensitive adhesive, acrylic-based pressure sensitive adhesive, rubber-based pressure sensitive adhesive, urethane-based pressure sensitive adhesive, polyester-based pressure sensitive adhesive, and polyvinyl ether-based pressure sensitive adhesive, among which the silicone-based pressure sensitive adhesive, acrylic-based pressure sensitive adhesive, or rubber-based pressure sensitive adhesive may be preferred and the silicone-based pressure sensitive adhesive is particularly preferred from the viewpoint of exhibiting good interfacial adhesion and from the viewpoint that the pressure sensitive adhesive is less likely to adversely affect the test using the testing member 100. The pressure sensitive adhesive which constitutes the pressure sensitive adhesive layer 20 may be active energy ray-curable or non-active energy ray-curable.

The silicone-based pressure sensitive adhesive may preferably contain an organopolysiloxane, in particular, an addition-type organopolysiloxane (a cured product thereof). The addition-type organopolysiloxane may preferably be obtained through a reaction between an organopolysiloxane of which the main skeleton is a siloxane bond and which has an alkenyl group and an organohydrogenpolysiloxane.

The organopolysiloxane of which the main skeleton is a siloxane bond and which has an alkenyl group may preferably be a compound that is represented by the following average unit formula (1) and has at least two alkenyl groups in the molecule.

$$R^1{}_a SiO_{(4-a)/2} \qquad (1)$$

(In the formula, each $R^1$ is independently the same or different unsubstituted or substituted monovalent hydrocarbon group of which the carbon number is 1 to 12 and preferably 1 to 8, and "a" is a positive number of 1.5 to 2.8, preferably 1.8 to 2.5, and more preferably 1.95 to 2.05.)

Examples of the above unsubstituted or substituted monovalent hydrocarbon group represented by $R^1$ bonded to the silicon atom include alkenyl groups such as a vinyl group, allyl group, propenyl group, isopropenyl group, butenyl group, hexenyl group, cyclohexenyl group and octenyl group, alkyl groups such as a methyl group, ethyl group, propyl group, isopropyl group, butyl group, isobutyl group, tert-butyl group, pentyl group, neopentyl group, hexyl group, cyclohexyl group, octyl group, nonyl group and decyl group, aryl groups such as a phenyl group, tolyl group, xylyl group and naphthyl group, aralkyl groups such as a benzyl group, phenylethyl group and phenylpropyl group, and those obtained by substituting a part or all of the hydrogen atoms of these groups with halogen atoms such as fluorine, bromine and chlorine, cyano groups, or other appropriate groups, for example, a chloromethyl group, chloropropyl group, bromoethyl group, trifluoropropyl group, cyanoethyl group, and the like. The alkenyl group may preferably be a vinyl group from the viewpoint of reducing the curing time and high productivity.

The organohydrogenpolysiloxane has a SiH group in the molecule. The above alkenyl group of the organopolysiloxane and the SiH group of the organohydrogenpolysiloxane react with each other through an addition reaction and an addition-type organopolysiloxane can thereby be obtained.

The addition-type organopolysiloxane is well cured in the presence of a platinum catalyst and, therefore, the above silicone-based pressure sensitive adhesive may preferably contain a platinum catalyst. Examples of the platinum catalyst include platinum black, platinum chloride, chloroplatinic acid, a reaction product of chloroplatinic acid and monohydric alcohol, a complex of chloroplatinic acid and olefins, and platinum bisacetoacetate.

The content of the platinum catalyst in the above silicone-based pressure sensitive adhesive may be preferably 0.01 mass parts or more and particularly preferably 0.05 mass parts or more to 100 mass parts of the addition-type organopolysiloxane. The content may be preferably 3 mass parts or less and particularly preferably 2 mass parts or less to 100 mass parts of the addition-type organopolysiloxane. The content of the platinum catalyst being within the above range allows the addition-type organopolysiloxane to be cured without interfering with the coating, and the pressure sensitive adhesive layer 20 exhibiting desired pressure sensitive adhesion property can be readily formed.

The addition-type organopolysiloxane can contain an organopolysiloxane (silicone resin) that contains a trifunctional or tetrafunctional siloxane unit in the molecule in order to increase the pressure sensitive adhesive strength.

The content of the organopolysiloxane (silicone resin component), which contains a trifunctional or tetrafunctional siloxane unit, in the above silicone-based pressure sensitive adhesive may be preferably more than 0 mass parts, particularly preferably 5 mass parts or more, and further preferably 10 mass parts or more, to 100 mass parts of the addition-type organopolysiloxane. The content may be preferably 100 mass parts or less, particularly preferably 70 mass parts or less, and further preferably 50 mass parts or less, to 100 mass parts of the addition-type organopolysiloxane. The content being within the above range allows the obtained pressure sensitive adhesive to readily develop desired pressure sensitive adhesion property.

If desired, the above silicone-based pressure sensitive adhesive may contain various commonly-used additives, such as a refractive index adjuster, antistatic, tackifier, silane coupling agent, antioxidant, ultraviolet absorber, light stabilizer, softening agent, filler, light curing agent, and photopolymerization initiator.

When the cover film for testing 1, 2 according to the present embodiment is manufactured through a method that includes formation of the pressure sensitive adhesive layer by laser etching as described later, the pressure sensitive adhesive layer 20 may preferably contain a laser light absorbent. Examples of the laser light absorbent include a near-infrared absorbent, infrared absorbent, and colorant. In the method including formation of the pressure sensitive adhesive layer 20 by laser etching, a layer of a pressure sensitive adhesive (which may be referred to as a "pre-etching pressure sensitive adhesive layer 20'''") may be formed on one surface of the base material 10, and the pre-etching pressure sensitive adhesive layer 20' may then be laser etched to form the pressure sensitive adhesive layer 20. Here, when the pressure sensitive adhesive layer 20 contains a laser light absorbent, the pre-etching pressure sensitive adhesive layer 20' also contains the laser light absorbent. The pre-etching pressure sensitive adhesive layer 20' therefore readily absorbs laser light, so that the workability by laser etching may be improved and the pressure sensitive adhesive layer 20 having a desired shape can readily be formed. Moreover, the pressure sensitive adhesive layer 20 which contains a laser light absorbent may be colored and, in this case, a secondary effect due to being colored can be obtained. Specifically, when the laser etching is performed for the pre-etching pressure sensitive adhesive layer 20', the region in which the pre-etching pressure sensitive adhesive layer 20' remains is colored, whereas the area from which the pre-etching pressure sensitive adhesive layer 20' is removed may be transparent. It is therefore easy to visually confirm whether or not the laser etching has been performed. Furthermore, when the cover film for testing 1, 2 and the substrate 3 are manually attached to each other to manufacture the testing member 100, it may be easy to visually confirm the attaching position and the like and the accuracy in attaching can therefore be further improved. In addition, also when the cover film for testing 1, 2 and the substrate 3 are attached to each other using an apparatus or the like, a position detection function by a sensor or the like may readily be used and the accuracy in attaching can thus be further improved. As described above, the pressure sensitive adhesive layer 20 may contain a laser light absorbent thereby to further improve the workability and productivity when manufacturing the testing member 100.

In general, the above near-infrared absorbent can be roughly classified into an organic near-infrared absorbent and an inorganic near-infrared absorbent.

Examples of the organic near-infrared absorbent include a cyanine-based compound, squarylium-based compound, thiol-nickel complex salt-based compound, naphthalocyanine-based compound, phthalocyanine-based compound, triallylmethane-based compound, naphthoquinone-based compound, anthraquinone-based compound, amino compounds such as perchlorate of N,N,N,N',N'-tetrakis(p-di-n-butylaminophenyl)-p-phenylenediaminium, chlorine salt of phenylenediaminium, hexafluoroantimonate of phenylenediaminium, fluoborate of phenylenediaminium, fluorine salt of phenylenediaminium and perchlorate of phenylenediammonium, and a copper phosphate compound obtained by a reaction between a copper compound and bisthiourea compound, between a phosphorus compound and copper compound, or between a phosphate compound and copper compound. Among these, the thiol-nickel complex salt-based compound, phthalocyanine-based compound, and fluorine-containing phthalocyanine compound may be preferred because of high transmittance in the visible light region and excellent absorption characteristics in the infrared region.

Examples of the inorganic near-infrared absorbent include a tungsten oxide-based compound, titanium oxide, zirconium oxide, tantalum oxide, niobium oxide, zinc oxide, indium oxide, tin-doped indium oxide (ITO), tin oxide, antimony-doped tin oxide (ATO), cesium oxide, zinc sulfide, and hexaboride compounds such as $LaB_6$, $CeB_6$, $PrB_6$, $NdB_6$, $GdB_6$, $TbB_6$, $DyB_6$, $HoB_6$, $YB_6$, $SmB_6$, $EuB_6$, $ErB_6$, $TmB_6$, $YbB_6$, $LuB_6$, $SrB_6$, $CaB_6$, and $(La, Ce)B_6$. Among these, the tungsten oxide-based compound may be preferred and a cesium-containing tungsten oxide represented by the formula $Cs_{0.2-0.4}WO_3$ may be particularly preferred because of high transmittance in the visible light region and excellent absorption characteristics in the infrared region.

One type of the above-described near-infrared absorbent may be solely used or two or more types may also be used in combination. In an embodiment, the inorganic near-infrared absorbent and the organic near-infrared absorbent may be used in combination.

The content of the laser light absorbent in the pressure sensitive adhesive layer 20 is not particularly limited, provided that it does not impair the desired pressure sensitive adhesion property, but may be preferably 0.1 mass % or more, particularly preferably 1.0 mass % or more, and further preferably 10 mass % or more. The content may be preferably 60 mass % or less, particularly preferably 50 mass % or less, and further preferably 40 mass % or less. The content of the laser light absorbent being within the above range can effectively improve the workability by laser etching without impairing necessary properties, such as the coatability of the pressure sensitive adhesive composition and the pressure sensitive adhesion property of the pressure sensitive adhesive layer 20.

The thickness of the pressure sensitive adhesive layer may be preferably 0.5 µm or more, particularly preferably 0.8 µm or more, and further preferably 1 µm or more. The thickness may be preferably 20 µm or less, particularly preferably 10 µm or less, and further preferably 5 µm or less. The thickness of the pressure sensitive adhesive layer 20 being 0.5 µm or more allows the pressure sensitive adhesive layer 20 to readily exhibit good pressure sensitive adhesion property and it is possible to well fix the cover film for testing 1, 2 including the pressure sensitive adhesive layer 20 to the substrate 3. The thickness of the pressure sensitive adhesive layer 20 being 20 µm or less can reduce the influence of the thickness of the pressure sensitive adhesive layer 20 on the test, and the test may be well performed in the obtained test member 100.

(3) Laser Etching Resistant Layer

The cover film for testing 1, 2 according to the present embodiment can be manufactured through a method that includes a step of forming the pressure sensitive adhesive layer 20 by laser etching as described later. In this case, as illustrated in FIG. 2, it may be preferred to provide a laser etching resistant layer 40 on the surface of the base material 10 at the pressure sensitive adhesive layer 20 side. The laser etching resistant layer 40 refers to a layer that is not damaged at all or scarcely damaged even when the layer is irradiated with laser light used for the above laser etching. In other words, the laser etching resistant layer 40 refers to a layer that is not affected at all or scarcely affected by laser light used for the laser etching even when the layer is irradiated with the laser light. That is, the laser etching resistant layer 40 refers to a layer that has certain transparency to laser light used for the laser etching.

More specifically, the laser etching resistant layer 40 preferably refers to a layer through which the transmittance of the laser light is 30% or more, particularly preferably refers to a layer through which the transmittance of the laser light is 50% or more, and further preferably refers to a layer through which the transmittance of the laser light is 70% or more. The above transmittance being 30% or more can reduce the absorption of energy of the laser light in the laser etching resistant layer 40, and the occurrence of damage on the surface of the laser etching resistant layer 40 can be suppressed. The obtained cover film for testing 2 can therefore have good transparency to the testing light. The upper limit of the above transmittance is not particularly limited and may be 100% or less. Details of the laser light used for the above laser etching are as described later.

With regard to the transparency of the laser etching resistant layer 40 to the laser light used for the laser etching, the haze value of the laser etching resistant layer 40 may be preferably 10% or less, particularly preferably 5% or less, and further preferably 1% or less. The haze value of the laser etching resistant layer 40 being 10% or less can reduce the scattering of laser light during the laser etching of the laser etching resistant layer 40, and the occurrence of damage on the surface of the laser etching resistant layer 40 can be suppressed. The obtained cover film for testing 2 can therefore have good transparency to the testing light. The lower limit of the haze value of the laser etching resistant layer 40 is not particularly limited, but may ordinarily be 0% or more.

Figure 3:
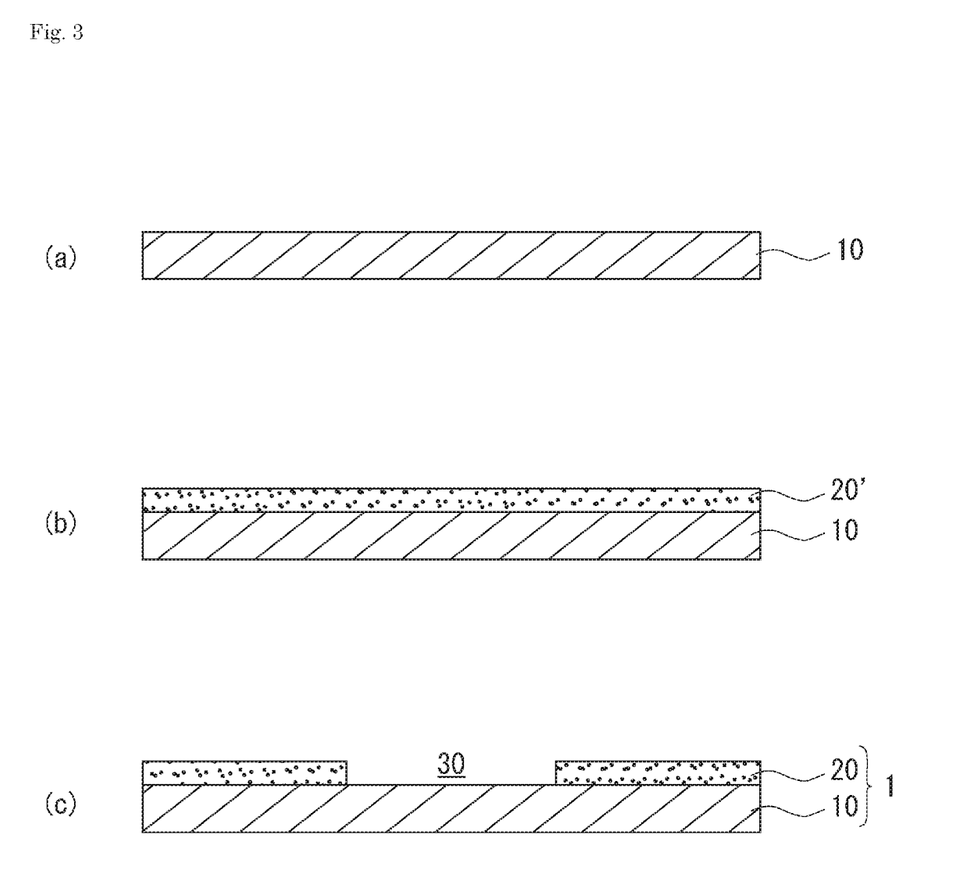
FIG. 3 is a set of cross-sectional views for describing a method of manufacturing the cover film for testing according to the first embodiment of the present invention.
Figure 4:
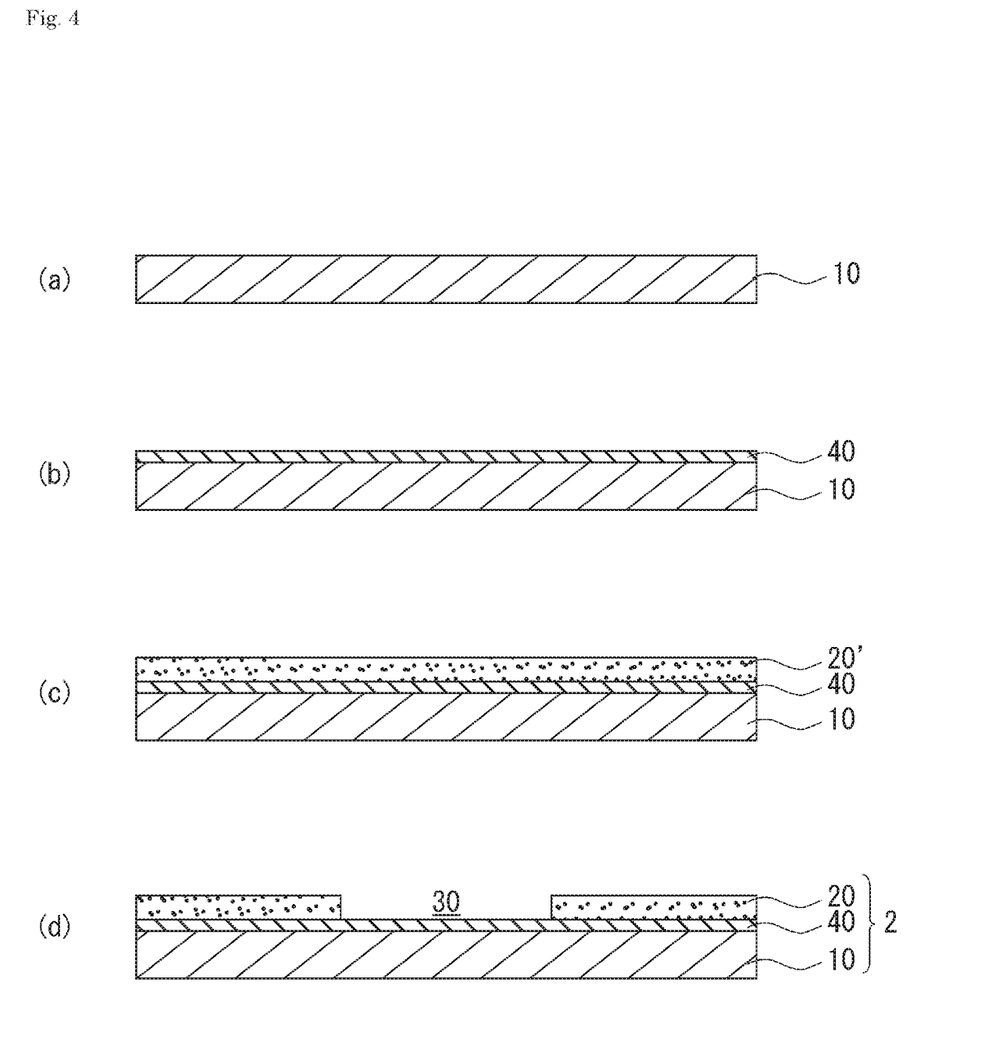
FIG. 4 is a set of cross-sectional views for describing a method of manufacturing the cover film for testing according to the second embodiment of the present invention.

In the manufacturing method using laser etching, after a layer of a pressure sensitive adhesive (pre-etching pressure sensitive adhesive layer 20') is formed on one surface of the base material 10 (see FIG. 3(b)), irradiation with laser light may be performed from the pre-etching pressure sensitive adhesive layer 20' side to remove a pressure sensitive adhesive at a predetermined location, thereby forming the pressure sensitive adhesive absent region 30 (see FIG. 3(c)). Here, prior to forming the pre-etching pressure sensitive adhesive layer 20', the laser etching resistant layer 40 can be provided on the base material 10 (see FIG. 4(b)) to suppress the base material 10 from being adversely affected by the laser light during the laser etching. In particular, it is possible to suppress an increase in the arithmetic average roughness (Ra) of a region of the base material 10 that overlaps with the pressure sensitive adhesive absent region 30 in the plan view. As a result, the arithmetic average roughness (Ra) of the region can readily be adjusted within a range, which will be described later, and the obtained testing member 100 enables a more accurate test.

The material which constitutes the laser etching resistant layer 40 is not particularly limited, provided that it has desired transparency to laser light used for the laser etching and also has excellent transparency to the testing light. For example, the laser etching resistant layer 40 may preferably be a layer that contains silicon dioxide ($SiO_2$) (which may be referred to as a "SiO₂ layer," hereinafter), a hard coat layer, or other appropriate layer. When the laser etching resistant layer 40 is such a layer, the surface exposed by the pressure sensitive adhesive absent region 30 on the surface of the laser etching resistant layer 40 at the pressure sensitive adhesive layer 20 side is less likely to be damaged by the laser etching. In the obtained cover film for testing 2, therefore, scattering of the testing light at that surface is less likely to occur and the test can be more accurately performed.

The method of forming the SiO₂ layer is not particularly limited, provided that the SiO₂ layer can be formed which has desired transparency to laser light used for the laser etching and also has excellent transparency to the testing light. For example, the SiO₂ layer can be formed using a physical vapor deposition method such as a sputtering method, vacuum vapor deposition method and ion plating method, or a chemical vapor deposition method such as a plasma chemical vapor deposition method, thermochemical vapor deposition method and photochemical vapor deposition method. Among these, the sputtering method may preferably be used to form the SiO₂ layer from the viewpoint that the layer quality and layer thickness can be controlled stably and with high accuracy.

In general, the sputtering method may be a method that includes introducing a discharge gas (such as argon and oxygen) into a vacuum chamber, applying a high-frequency voltage or DC voltage between a target of an inorganic material and an object for deposition such as a substrate (e.g. plastic film) to generate plasma from the discharge gas, making the plasma collide with the target to blow off the target material, and depositing the target material on the object for deposition to obtain a thin film of the target material. When forming the above SiO₂ layer, silicon, silicon dioxide, or the like may be used as the target.

Examples of the sputtering method include a two-electrode method which is a basic scheme; a three-electrode method in which a hot cathode that emits thermoelectrons is added to the two-electrode method; a magnetron sputtering method in which a magnetic field generating means applies a magnetic field to the target surface to stabilize the plasma and increase the film formation speed; an ion beam method in which the target is irradiated with a high-energy ion beam; a facing target method in which two targets are opposed parallel to each other and a magnetic field is applied perpendicularly to these target surfaces; an ECR method using electron cyclotron resonance (ECR); a coaxial sputtering method in which the target and the substrate are arranged in coaxial cylindrical shapes; and a reactive sputtering method in which a reactive gas is supplied to the vicinity of the substrate to control the film formation composition. Among these, the magnetron sputtering method may preferably be used. Sputtering conditions when performing the sputtering method may be appropriately set in accordance with the properties of the SiO₂ film to be formed, the method to be used, and other factors.

The hard coat layer is not particularly limited, provided that it has desired transparency to laser light used for the laser etching and also has excellent transparency to the testing light. For example, the hard coat layer may be one that is formed by thermal curing or one that is formed by curing through irradiation with active energy rays. In particular, the hard coat layer may preferably be one that is formed by thermal curing, from the viewpoint that components that absorb the testing light are less likely to remain in the hard coat layer and the test may thereby be readily performed better.

Examples of the hard coat layer formed by thermal curing include a silicone-based hard coat layer. The silicone-based hard coat layer may be a layer that contains a silicon compound having a siloxane bond. Preferred examples thereof include, for example, a layer that contains an inorganic silica-based compound (including polysilicic acid) and/or a polyorganosiloxane-based compound as the primary component or components.

The inorganic silica-based compound, the polyorganosiloxane-based compound, or a mixed system thereof can be produced through various methods as below. For example, a method may preferably be used which includes partially or completely hydrolyzing an alkoxysilane compound represented by the following general formula (2) for polycondensation using an inorganic acid such as hydrochloric acid and sulfuric acid or an organic acid such as oxalic acid and acetic acid.

$$R^2{}_n Si(OR^3)_{4-n} \qquad (2)$$

(In the formula, $R^2$ represents a nonhydrolyzable group that is an alkyl group, substituted alkyl group (examples of the substituent include a halogen atom, epoxy group, and (meth)acryloyloxy group), alkenyl group, aryl group, or aralkyl group, $R_3$ represents a lower alkyl group, and n is 0 or an integer of 1 to 3. When a plurality of $R^2$s and a plurality of $OR^3$s are present, the plurality of $R^2$s may be the same or different and the plurality of $OR^3$s may be the same or different.)

In this case, an inorganic silica-based binder may be obtained when completely hydrolyzing a compound of which n is 0, that is, tetraalkoxysilane, while a polyorganosiloxane-based binder or a mixed binder of an inorganic silica-based binder and a polyorganosiloxane-based binder may be obtained when partially hydrolyzing that compound. On the other hand, a compound of which n is 1 to 3 has a nonhydrolyzable group and, therefore, a polyorganosiloxane-based binder may be obtained when partially or completely hydrolyzing that compound. In an embodiment, some organic solvent may be used in order to uniformly perform the hydrolysis.

Examples of the alkoxysilane compound represented by the general formula (2) include tetramethoxysilane, tetraethoxysilane, tetra-n-propoxysilane, tetraisopropoxysilane, tetra-n-butoxysilane, tetraisobutoxysilane, tetra-sec-butoxysilane, tetra-tert-butoxysilane, methyltrimethoxysilane, methyltriethoxysilane, methyltripropoxysilane, methyltriisopropoxysilane, ethyltrimethoxysilane, ethyltriethoxysilane, propyltriethoxysilane, butyltrimethoxysilane, phenyltrimethoxysilane, phenyltriethoxysilane, γ-glycidoxypropyltrimethoxysilane, γ-acryloyloxypropyltrimethoxysilane, γ-methacryloyloxypropyltrimethoxysilane, dimethyldimethoxysilane, methylphenyldimethoxysilane, vinyltrimethoxysilane, vinyltriethoxysilane, divinyldimethoxysilane, divinyldiethoxysilane, trivinylmethoxysilane, and trivinylethoxysilane. These may be used alone or two or more types may also be used in combination. In an embodiment, if necessary, an appropriate amount of an aluminum compound such as aluminum chloride and trialkoxyaluminum can be added. In an alternative embodiment, another method can be used which includes acting an acid such as hydrochloric acid, sulfuric acid and nitric acid or a metal compound such as magnesium chloride and calcium sulfate using sodium metasilicate, sodium orthosilicate or water glass (mixture of sodium silicate) as a silicon compound as the raw material to perform a hydrolysis process. This hydrolysis process generates a free silicic acid, which may readily polymerize and is a mixture of chains, rings, and meshes depending on the type of raw material. The polysilicic acid obtained from the water glass may mainly have a chain-like structure that is represented by the following general formula (3).

[Chemical Formula 1]

(3)

(In the formula, m represents a degree of polymerization and $R^4$ represents hydrogen, silicon, or a metal such as magnesium and aluminum.)

Thus, a complete inorganic silica binder may be obtained. In an embodiment, silica gel ($SiO_x.nH_2O$) can be used as the organic silica-based binder.

In the above hard coat layer, laser etching resistance and transparency to the testing light during the test may be important. The hard coat layer may therefore contain a large amount of the inorganic silica-based compound to an extent that can maintain the necessary interfacial adhesion, the durability against laser light used for the laser etching, and the transparency to the testing light.

The above hard coat layer can be formed through coating the base material 10 with a hard coat agent-containing coating liquid using a known method, such as a bar coating method, knife coating method, roll coating method, blade coating method, die coating method, and gravure coating method, and heating the coating liquid to cure it.

The thickness of the laser etching resistant layer 40 may be preferably 0.05 μm or more, particularly preferably 0.1 μm or more, and further preferably 1 μm or more. The thickness may be preferably 10 μm or less, particularly preferably 5 μm or less, and further preferably 3 μm or less. The thickness of the laser etching resistant layer 40 being 0.05 μm or more allows the laser etching resistant layer 40 to readily exhibit good resistance to the laser etching. The thickness of the laser etching resistant layer 40 being 10 μm or less can suppress the cover film for testing 2 from being unduly thick, and the test may be well performed in the obtained testing member 100.

(4) Release Sheet

In the cover film for testing 1, 2 according to the present embodiment, to protect the pressure sensitive adhesive layer 20 until the cover film for testing 1, 2 is laminated on the substrate 3, a release sheet may be provisionally laminated on the surface of the pressure sensitive adhesive layer 20 opposite to the base material 10. The shape in the plan view of the release sheet may preferably be the same as the shape in the plan view of the base material 10, but may also be the same as the shape in the plan view of the pressure sensitive adhesive layer 20.

Examples of the release sheet to be used include a polyethylene film, polypropylene film, polybutene film, polybutadiene film, polymethylpentene film, polyvinyl chloride film, vinyl chloride copolymer film, polyethylene terephthalate film, polyethylene naphthalate film, polybutylene terephthalate film, polyurethane film, ethylene vinyl acetate film, ionomer resin film, ethylene-(meth)acrylic acid copolymer film, ethylene-(meth)acrylic ester copolymer film, polystyrene film, polycarbonate film, polyimide film, fluorine resin film, and liquid crystal polymer film. Crosslinked films thereof may also be used. Laminated films thereof may also be used.

The release surface (surface in contact with the pressure sensitive adhesive layer 20) of the release sheet may preferably be subjected to release treatment. Examples of the release agent used in the release treatment include alkyd-based, silicone-based, fluorine-based, unsaturated polyester-based, polyolefin-based, and wax-based release agents.

The thickness of the release sheet is not particularly limited, but may ordinarily be 20 μm or more and 150 μm or less.

2. Physical Properties of Cover Film for Testing

In the surface of the cover film for testing 1, 2 according to the present embodiment at the pressure sensitive adhesive layer 20 side, the arithmetic average roughness (Ra) of the region in which the pressure sensitive adhesive layer 20 does not exist may be preferably 200 nm or less, particularly preferably 100 nm or less, and further preferably 50 nm or less. Here, in the cover film for testing 1 illustrated in FIG. 1, the above arithmetic average roughness (Ra) refers to the arithmetic average roughness (Ra) of the surface exposed by the pressure sensitive adhesive absent region 30 on the surface of the base material 10 at the pressure sensitive adhesive layer 20 side, while in the cover film for testing 2 illustrated in FIG. 2, the above arithmetic average roughness (Ra) refers to the arithmetic average roughness (Ra) of the surface exposed by the pressure sensitive adhesive absent region 30 on the surface of the laser etching resistant layer 40 at the pressure sensitive adhesive layer 20 side. The arithmetic average roughness (Ra) being 200 nm or less can suppress diffuse reflection of the testing light in the region in which the pressure sensitive adhesive layer 20 does not exist, and the cover film for testing 1, 2 may readily have transparency to the testing light. This allows the obtained testing member 100 to have improved accuracy in the test. The lower limit of the arithmetic average roughness (Ra) is not particularly limited, but in general may be preferably 0.1 nm or more, particularly preferably 0.5 nm or more, and further preferably 1 nm or more. The method of measuring the arithmetic average roughness (Ra) is as described in the exemplary test, which will be described later.

In the cover film for testing 1, 2 according to the present embodiment, the arithmetic average roughness (Ra) of the surface of the base material 10 opposite to the pressure sensitive adhesive layer 20 may be preferably 200 nm or less, particularly preferably 100 nm or less, and further preferably 50 nm or less. The arithmetic average roughness (Ra) being 200 nm or less can suppress the diffuse reflection of the testing light at the surface of the cover film for testing 1, 2 at the base material 10 side and the cover film for testing 1, 2 may readily have excellent transparency to the testing light. As a result, the obtained testing member 100 can have improved accuracy in the test. The lower limit of the above arithmetic average roughness (Ra) is not particularly limited, but in general may be preferably 0.1 nm or more, particularly preferably 0.5 nm or more, and further preferably 1 nm or more. The above arithmetic average roughness (Ra) can be obtained by applying the method of measuring the arithmetic average roughness Ra described in the exemplary test, which will be described later, to the surface of the base material 10 opposite to the surface on which the pressure sensitive adhesive layer 20 is laminated.

3. Method of Manufacturing Cover Film for Testing

The cover film for testing 1, 2 according to the present embodiment may preferably be manufactured through a method that includes formation of the pressure sensitive adhesive layer by laser etching or a method that includes formation of the pressure sensitive adhesive layer by printing, as will be described below.

(1) Method Including Formation of Pressure Sensitive Adhesive Layer by Laser Etching In the method including formation of the pressure sensitive adhesive layer by laser etching, after the pre-etching pressure sensitive adhesive layer 20' is laminated on one surface of the base material 10 or on the surface at the laser etching resistant layer 40 side of the laminate of the base material 10 and the laser etching resistant layer 40, the pressure sensitive adhesive of a predetermined portion in the pre-etching pressure sensitive adhesive layer 20' may be removed by laser etching to form the pressure sensitive adhesive absent region 30, consequently forming the pressure sensitive adhesive layer 20. The method including formation of the pressure sensitive adhesive layer by laser etching allows the pre-etching pressure sensitive adhesive layer 20' to be worked into a complex shape because it is easy to preliminarily determine a target shape pattern and irradiate the pattern with laser light at predetermined positions. The cover film for testing 1, 2 including the pressure sensitive adhesive layer 20 having a desired shape can therefore be readily manufactured. Thus, the above method can achieve an improved yield rate and advantages in the cost and can respond to the small-lot production. Moreover, the above method is easy to work the pre-etching pressure sensitive adhesive layer 20' into a desired shape regardless of its thickness. In other words, the above method is excellent in the degree of freedom of working in the depth direction. Furthermore, in the above method, it is easy to control the pressure, flow rate, etc. of the gas to be used during the laser etching and it is thus easy to separate (remove) reaction products generated during the working.

FIG. 3 illustrates a set of cross-sectional views for describing a method of manufacturing the cover film for testing 1 according to the present embodiment. This method includes a step of laminating a pressure sensitive adhesive on one surface of the base material 10 (this step may be referred to as a "pressure sensitive adhesive lamination step," hereinafter) and a step of removing at least a part of the above pressure sensitive adhesive to form the pressure sensitive adhesive layer 20, the part of the pressure sensitive adhesive being located in a region that overlaps with the grooves 5 in the plan view when the testing member 100 is constituted (this step may be referred to as a "laser etching step," hereinafter). The above manufacturing method will be described below.

First, as illustrated in FIG. 3(a), the base material 10 may be prepared. Subsequently, as illustrated in FIG. 3(b), the pressure sensitive adhesive may be laminated on the base material 10 in the pressure sensitive adhesive lamination step to obtain a laminate comprising the base material 10 and the pre-etching pressure sensitive adhesive layer 20'.

Examples of the method of laminating a pressure sensitive adhesive on one surface of the base material 10 to form the pre-etching pressure sensitive adhesive layer 20' include a method of transferring the pre-etching pressure sensitive adhesive layer 20', which is formed on a process sheet, for example, to the one surface of the base material 10. The method in this case may include preparing a coating liquid that contains a pressure sensitive adhesive composition and if necessary further contains some solvent or dispersant, coating one surface of the process sheet with the coating liquid to form a coating film using a coater, such as a die coater, curtain coater, spray coater, slit coater, and knife coater, and drying the coating film to obtain a laminate comprising the pre-etching pressure sensitive adhesive layer 20' and the process sheet. Thereafter, the surface of the laminate at the pre-etching pressure sensitive adhesive layer 20' side and one surface of the base material 10 may be attached to each other and the process sheet may then be released from the pre-etching pressure sensitive adhesive layer 20' to obtain a laminate of the base material 10 and the pre-etching pressure sensitive adhesive layer 20'.

Properties of the above coating liquid are not particularly limited, provided that the coating is possible. The coating liquid may contain a component for forming the pre-etching pressure sensitive adhesive layer 20' as a solute in an embodiment or as a dispersant in another embodiment. The previously-described release sheet may be used as the above process sheet. In this case, the release surface of the release sheet may preferably be coated with the above coating liquid. Examples of the above solvent include organic solvents, such as toluene, ethyl acetate, and methyl ethyl ketone.

Another method may be employed as the method of laminating a pressure sensitive adhesive on one surface of the base material 10 to form the pre-etching pressure sensitive adhesive layer 20'. This method may include coating one surface of the base material 10 with the previously-described coating liquid to form the pre-etching pressure sensitive adhesive layer 20' on the base material 10.

Subsequently, as illustrated in FIG. 3(c), the laser etching step may be performed in which a predetermined portion of the pre-etching pressure sensitive adhesive layer 20' is removed by irradiation with laser light to form the pressure sensitive adhesive absent region 30, thereby forming the pressure sensitive adhesive layer 20. The cover film for testing 1 according to the present embodiment can thus be obtained.

The laminate of the base material 10 and the pre-etching pressure sensitive adhesive layer 20' may ordinarily be irradiated with the above laser light from the pre-etching pressure sensitive adhesive layer 20' side. The region in the plan view to be irradiated may be a region that includes at least the region which overlaps with the grooves 5 in the plan view when the testing member 100 is constituted. That is, a region having the same shape in the plan view as that of the region formed with the grooves 5 may be irradiated or an additional region may also be irradiated in addition to that region. In particular, from the viewpoint of effectively suppressing the pressure sensitive adhesive from invading into the grooves 5, it may be preferred not to provide the pressure sensitive adhesive layer 20 around the region having the same shape in the plan view as that of the region formed with the grooves 5. To this end, it may be preferred to perform irradiation with laser for a region that is wider than and includes the region having the same shape in the plan view as that of the region formed with the grooves 5.

Irradiation with laser light can be performed under general conditions. For example, the type of laser light to be used is not particularly limited. For example, carbon dioxide ($CO_2$) laser, TEA-$CO_2$ laser, YAG laser, UV-YAG laser, excimer laser, semiconductor laser, $YVO_4$ laser, YLF laser, or appropriate laser can be utilized. The wavelength of laser light for irradiation may be preferably 0.8 µm or more and particularly preferably 1 µm or more. The wavelength may be preferably 12 µm or less and particularly preferably 11 µm or less. The wavelength of the laser light for irradiation being in the above range allows the pre-etching pressure sensitive adhesive layer 20' to have good workability, and the desired cover film for testing 1 can be effectively obtained.

FIG. 4 illustrates a set of cross-sectional views for describing a method of manufacturing the cover film for testing 2 according to the present embodiment. This method includes a step of forming the laser etching resistant layer 40 on one surface of the base material 10 (this step may be referred to as a "laser etching resistant layer formation step"), a step of laminating a pressure sensitive adhesive on one surface of the laser etching resistant layer 40 (pressure sensitive adhesive lamination step), and a step of removing at least a part of the above pressure sensitive adhesive to form the pressure sensitive adhesive layer 20, the part of the pressure sensitive adhesive being located in a region that overlaps with the grooves 5 in the plan view when the testing member 100 is constituted (this step may be referred to as a "laser etching step," hereinafter). The above manufacturing method will be described below.

First, as illustrated in FIG. 4(a), the base material 10 may be prepared. Subsequently, as illustrated in FIG. 4(b), the laser etching resistant layer 40 may be formed on one surface of the base material 10 in the laser etching resistant layer formation step to obtain a laminate comprising the base material 10 and the laser etching resistant layer 40.

The method of forming the laser etching resistant layer 40 on one surface of the base material 10 is not particularly limited. When forming the previously-described $SiO_2$ layer as the laser etching resistant layer 40, the $SiO_2$ layer can be formed, for example, by a sputtering method using silicon dioxide as the target. When forming the previously-described hard coat layer formed by thermal curing, the hard coat layer can be formed through coating the base material 10 with a coating liquid that contains a hard coat agent using a known method and heating the coating liquid to cure it.

Subsequently, as illustrated in FIG. 4(c), the pressure sensitive adhesive may be laminated on the surface at the laser etching resistant layer 40 side of the obtained laminate as the above comprising the base material 10 and the laser etching resistant layer 40 in the pressure sensitive adhesive lamination step, thus forming the pre-etching pressure sensitive adhesive layer 20'. The pressure sensitive adhesive lamination step in the method of manufacturing the cover film for testing 2 according to the second embodiment can be performed in the same manner as in the pressure sensitive adhesive lamination step in the method of manufacturing the cover film for testing 1 according to the first embodiment except that the previously-described pre-etching pressure sensitive adhesive layer 20' is formed on the surface at the laser etching resistant layer 40 side of the laminate comprising the base material 10 and the laser etching resistant layer 40.

Subsequently, as illustrated in FIG. 4(d), the laser etching step may be performed in which a predetermined portion of the pre-etching pressure sensitive adhesive layer 20' is removed by irradiation with laser light to form the pressure sensitive adhesive absent region 30, thereby forming the pressure sensitive adhesive layer 20. In the method of manufacturing the cover film for testing 2 according to the second embodiment, provision of the laser etching resistant layer 40 can suppress an adverse effect of the laser etching on the surface of the base material 10. The laser etching step in the method of manufacturing the cover film for testing 2 according to the second embodiment can be performed in the same manner as in the laser etching step in the method of manufacturing the cover film for testing 1 according to the first embodiment. The cover film for testing 2 according to the present invention can thus be obtained.

(2) Method Including Formation of Pressure Sensitive Adhesive Layer by Printing

The method including formation of the pressure sensitive adhesive layer by printing may comprise a step of printing a pressure sensitive adhesive on the region, which does not overlap with the grooves 5 in the plan view when the testing member 100 is constituted, to form the pressure sensitive adhesive layer 20. This method does not require providing the laser etching resistant layer 40 because the previously-described laser etching is not performed. This method may therefore be suitable for manufacturing the cover film for testing 1 which comprises the base material 10 and the pressure sensitive adhesive layer 20. Moreover, this method is capable of forming the pressure sensitive adhesive layer 20 having a desired shape in fewer steps as compared with the previously-described method of performing laser etching and may thus be advantageous in the cost and suitable for large-lot production. Furthermore, the method including formation of the pressure sensitive adhesive layer by printing is easy to control the thickness of the pressure sensitive adhesive layer 20 and can readily manufacture the cover film for testing 1, 2 including the pressure sensitive adhesive layer 20 which has a desired thickness.

A commonly-used method can be used as the method of printing the pressure sensitive adhesive. For example, the pressure sensitive adhesive layer 20 can be formed through printing a pressure sensitive adhesive for printing on the region, which does not overlap with the grooves 5 in the plan view when the testing member 100 is constituted, on one surface of the base material 10, such as by screen printing, gravure printing, offset printing, and ink jet printing. Among the above-described printing methods, the screen printing may be preferred from the viewpoint that the pressure sensitive adhesive layer 20 having a predetermined shape can be formed accurately.

<Testing Member>

FIG. 5 illustrates a cross-sectional view of the testing member 100 according to the present embodiment. The testing member 100 comprises a substrate 3 having a surface provided with at least one groove 5 and the cover film for testing 1 according to the first embodiment laminated on the surface of the substrate 3 provided with the grooves 5. In the testing member 100, the location of the pressure sensitive adhesive absent region 30 in the cover film for testing 1 and the grooves of the substrate 3 overlap with each other in the plan view.

The testing member 100 according to the present embodiment may be for performing an optical test for a specimen stored in each groove 5.

In the testing member 100 according to the present embodiment, the cover film for testing 1 and the substrate 3 are well fixed to each other via the pressure sensitive adhesive layer 20 of the cover film for testing 1. Moreover, in the testing member 100, the pressure sensitive adhesive layer 20 does not exist in the region which overlaps with the grooves 5 in the plan view and it is thereby possible to prevent the pressure sensitive adhesive, which constitutes the pressure sensitive adhesive layer 20, from invading into the grooves 5 or from filling the grooves 5. As the above, according to the testing member 100 of the present embodiment, the test can be well performed.

The testing member 100 according to the present embodiment includes the cover film for testing 1 according to the first embodiment, but may also include the cover film for testing 2 according to the second embodiment as substitute for the cover film for testing 1.

The shape in the plan view of the testing member 100 according to the present embodiment is not particularly restricted, but may preferably be a disk-like shape or chip-like shape. The disk-like shape refers to a precisely circular shape or its modified shape in the plan view of the testing member 100. In the case of such a disk-like shape, a hole may be provided at the center of the testing member 100. The shape of the hole may be a circular shape that is concentric in the plan view with the circumference of the testing member 100. The chip-like shape refers to a square shape, rectangular shape, or their modified shapes in the plan view of the testing member 100.

1. Configuration of Testing Member (1) Substrate

In the testing member 100 according to the present embodiment, the substrate 3 is not particularly limited, provided that the test can be performed using the testing member 100 which includes the substrate 3. From the viewpoint of enabling a good test, it may be preferred for the substrate 3 to have transparency to the testing light.

As a material of the substrate 3, a resin, glass, and other appropriate material can be used, among which the resin may preferably be used from the viewpoint of easy production and easy handling. As the resin, resins that constitute the previously-described resin films can be used as in the base material 10. Among such resins, polycarbonate, polyethylene terephthalate, polybutylene terephthalate, cycloolefin resin, or acrylic resin may preferably be used and the polycarbonate may be particularly preferably used from the viewpoint of excellent transparency to the testing light. As previously described, the same material as that of the base material 10 may preferably be used as a material of the substrate 3 from the viewpoint of reducing the difference in the transparency to the testing light.

In the testing member 100 according to the present embodiment, the transmittance of the testing light through the substrate 3 may be preferably 60% or higher, particularly preferably 80% or higher, and further preferably 90% or higher. The above transmittance being 60% or higher allows the testing member 100 to have better transparency to the testing light and the test can be more accurately performed. The upper limit of the above transmittance is not particularly limited and may be 100% or lower.

In the testing member 100 according to the present embodiment, the haze value of the substrate 3 may be preferably 10% or less, particularly preferably 5% or less, and further preferably 1% or less. The haze value of the substrate 3 being 10% or less can effectively reduce the scattering of the testing light in the substrate 3. In the testing member 100, therefore, the test can be more accurately performed. The lower limit of the haze value of the substrate 3 is not particularly limited, but may ordinarily be 0% or more.

In the substrate 3, for the purpose of improving the interfacial adhesion with the pressure sensitive adhesive layer 20, the surface of the substrate 3 on which the pressure sensitive adhesive layer 20 is to be laminated can be subjected to surface treatment, such as using an oxidation method and roughening method, or primer treatment, provided that the transparency to the testing light is not impaired. Specific examples of the above oxidation method and roughening method include those which are previously described as such treatment for the base material 10. These surface treatment methods may be appropriately selected in accordance with the type of the material which constitutes the substrate 3.

One surface of the substrate 3 is provided with at least one groove 5. In the substrate 3 of the testing member 100 illustrated in FIG. 5, the surface of the substrate 3 at the pressure sensitive adhesive layer 20 side is provided with a plurality of grooves 5 (three grooves 5 in FIG. 5) that each have a width w1 and depth d1.

The cross-sectional shape of each groove 5 is not limited, provided that the groove 5 can store a specimen and the test can be well performed. In FIG. 5, the shape of the cross section is a triangle, but is not limited to this. In an alternative embodiment, the shape of the cross section may be a square, rectangle, semicircle, or other appropriate shape.

The shape in the plan view of each groove 5 is also not limited, provided that the groove 5 can store a specimen and the test can be well performed. For example, the shape may be a line-like shape, dot-like shape, or other appropriate shape. From the viewpoint that the testing light can be scanned along the groove 5, the shape may preferably be a line-like shape. In the case of the line-like shape, the shape in the plan view of the groove 5 may preferably be a linear shape or curved shape. When the testing member 100 is in the previously-described disk-like shape, the groove 5 may preferably be arranged in a circular shape that is concentric in the plan view with the outer circumference of the testing member 100. In this case, scanning of the testing light for the groove 5 can be easily performed by rotating the testing member 100 around an axis of rotation, that is, a straight line that passes through the center of the circular shape and is orthogonal to the circular shape.

Surface treatment for improving the wettability may preferably be performed for the surface of the substrate 3 at the cover film for testing 1, 2 side, in particular, for portions of the surface that constitute the grooves 5. This allows a specimen to be well stored in each groove 5 because the specimen wets the groove 5 and spreads along the groove 5 when the specimen is stored in the groove 5. Examples of the above surface treatment include a method of coating the objected surface with a component that improves the wettability and a method of performing surface modification. Examples of the component which improves the wettability include components for hydrophilic coating. Examples of the scheme of surface modification include corona treatment, plasma treatment, ultraviolet ray treatment, and flame treatment.

With regard to the above wettability, the surface tension on the surface of the substrate 3 at the cover film for testing 1, 2 side may be preferably 30 mN/m or more, particularly preferably 35 mN/m or more, and further preferably 40 mN/m or more. The surface tension being 30 mN/m or more allows the specimen to be well stored in each groove 5 because the specimen wets the groove 5 and spreads along the groove 5 when the specimen is stored in the groove 5. As a result, the test may be well performed. The upper limit of the surface tension is not particularly limited, but in general may be preferably 70 mN/m or less, particularly preferably 65 mN/m or less, and further preferably 60 mN/m or less. The surface tension refers to a value that is measured by a wetting tension test in accordance with JIS K6768: 1990.

In the testing member 100 according to the present embodiment, dimensions of each groove 5 can be set in accordance with the method of testing to be performed and the type of the specimen. For example, the width w1 of the groove 5 may be preferably 50 nm or more, particularly preferably 100 nm or more, and further preferably 150 nm or more. The width w1 may be preferably 30 μm or less, particularly preferably 10 μm or less, and further preferably 1 μm or less. The depth d1 of the groove 5 may be preferably 50 nm or more, particularly preferably 100 nm or more, and further preferably 150 nm or more. The depth d1 may be preferably 30 μm or less, particularly preferably 10 μm or less, and further preferably 1 μm or less. The width w1 and depth d1 of each groove 5 being within the above ranges can sufficiently ensure the length along which the testing light transmits through the specimen, while suppressing the necessary amount of the specimen.

In the testing member 100 according to the present embodiment, the arithmetic average roughness (Ra) of the surface of the substrate 3 opposite to the surface formed with the grooves 5 may be preferably 200 nm or less, particularly preferably 100 nm or less, and further preferably 50 nm or less. The arithmetic average roughness (Ra) being 200 nm or less can suppress the diffuse reflection of the testing light at the surface of the testing member 100 at the substrate 3 side and the testing member 100 may readily have excellent transparency to the testing light to improve the accuracy in the test. The lower limit of the above arithmetic average roughness (Ra) is not particularly limited, but in general may be preferably 0.1 nm or more, particularly preferably 0.5 nm or more, and further preferably 1 nm or more. The above arithmetic average roughness (Ra) can be obtained by applying the method of measuring the arithmetic average roughness Ra as described in the exemplary test, which will be described later, to the surface of the substrate 3 opposite to the surface formed with the grooves 5.

In the testing member 100 according to the present embodiment, the thickness of the substrate 3 (distance between the surface laminated with the pressure sensitive adhesive layer 20 and the opposite surface) may be preferably 0.5 mm or more, particularly preferably 0.8 mm or more, and further preferably 1 mm or more. The thickness may be preferably 10 mm or less, particularly preferably 5 mm or less, and further preferably 3 mm or less. The thickness of the substrate 3 being 0.5 mm or more allows the substrate 3 to have sufficient strength and it is possible to effectively suppress the deformation of the testing member 100 when it stores the specimen and is used for the test. The thickness of the substrate 3 being 10 mm or less allows the testing light to readily arrive at the specimen during the test and the test may be accurately performed.

(2) Others

The testing member 100 according to the present embodiment may be provided with an opening part for storing the specimen in each groove 5. The opening part may be provided at at least either of the cover film for testing 1, 2 and the substrate 3, but in particular may preferably be provided at the cover film for testing 1, 2. With regard to the shape and size of the opening part, the opening part may preferably be formed in a shape that is suitable for a storing means used for storing the specimen in the groove 5. A syringe, pipette, or other appropriate instrument may be used as the storing means. When a syringe is used, for example, the opening part may preferably have a shape and size that allow the tip of an injection needle of the syringe to reach the groove 5. As will be understood, when the testing member 100 according to the present embodiment is provided with the above opening part, it is preferred to provide an air-bleeding hole.

2. Method of Manufacturing Testing Member

The testing member 100 according to the present embodiment may preferably be manufactured by attaching the surface of the previously-described cover film for testing 1, 2 at the pressure sensitive adhesive layer 20 side (when the previously-described release sheet is laminated, the pressure sensitive adhesive surface of the pressure sensitive adhesive layer 20 which is exposed by releasing the release sheet) and the surface of the substrate 3 at the side formed with the grooves 5 to each other. This attaching may be performed such that the grooves 5 of the substrate 3 are included in the plan view in the pressure sensitive adhesive absent region 30 of the cover film for testing 1, 2.

The method of manufacturing the substrate 3 is not particularly limited. When the substrate 3 is formed of a resin, the substrate 3 may preferably be manufactured through molding the substrate 3, such as by injection molding, compression molding and insertion molding, and if necessary performing other processing, such as surface processing.

3. Method of Using Testing Member

The testing member 100 according to the present embodiment can be used for an optical test for a specimen. Specifically, after a specimen is stored in each groove 5 of the testing member 100, the stored specimen may be irradiated with light from outside of the testing member 100 and the light caused by the irradiation may be measured outside the testing member 100.

The specimen may preferably have flowability from the viewpoint that the specimen can readily be stored in each groove 5. Examples of the specimen include a liquid, sol-like component, and gel-like component. In particular, the specimen may preferably be a liquid. The liquid may contain a solid component. Specific examples of the specimen include water as an object of a water quality test, cell extract, blood, cultured cell liquid, bacteria, archaebacteria, virus, protein, algae, and microbe.

The specimen can be stored in each groove 5 through supplying the specimen into the groove 5 via the opening part provided at the testing member 100, for example, using the previously-described storing means. In an embodiment, a syringe or the like provided with an injection needle may be used to operate the injection needle to penetrate at a certain position of the testing member 100 and the specimen may then be supplied into the groove 5 via the syringe.

Irradiation of the stored specimen with the testing light and the subsequent measurement may be selected in accordance with the purpose of the test. For example, when measuring the concentration of a component that absorbs light of a certain wavelength, the absorbance at the wavelength may be measured. Specifically, the specimen is irradiated with the testing light which includes light of the wavelength, and the amount of light of the wavelength included in the light which transmits through the specimen may then be measured. On the basis of the absorbance thus obtained, the amount of the above component in the specimen can be estimated. In the case of a test for the turbidity of the specimen, scattering light is detected which is generated when the testing light with which the specimen is irradiated encounters particles included in the specimen and, on the basis thereof, the degree of turbidity due to the particles can be estimated. In the case of a test for an activity state, as an index of the state of cells or blood, of a fluorescent component in the specimen which contains the cells or blood, a desired test can be performed through irradiating the specimen with the testing light which includes exciting light and measuring the fluorescence which is emitted from the fluorescent component due to the irradiation.

The type of testing light can be selected in accordance with the purpose of the test. The testing light may be, for example, laser light. In this case, the wavelength of the testing light may be preferably 200 nm or more and particularly preferably 400 nm or more. The wavelength may be preferably 1,000 nm or less and particularly preferably 800 nm or less. In particular, it may be preferred to use Ar laser (wavelength: 488 to 514 nm) or He—Ne laser (wavelength: 630 nm) as the testing light.

When the testing member 100 is used, the testing member 100 may be cooled or heated in accordance with the specimen to be used and the test to be performed. When the testing member 100 is heated, however, it may be preferred to perform the heating up to a temperature lower than the melting point of each material that constitutes the testing member 100, from the viewpoint of suppressing the deformation due to heat of the testing member 100.

It should be appreciated that the embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the testing member 100, the pressure sensitive adhesive layer 20 may be provided between the base material 10 or the laser etching resistant layer 40 and the substrate 3 in the cross section and between adjacent grooves 5 in the plan view.

EXAMPLES

Hereinafter, the present invention will be described further specifically with reference to examples, etc., but the scope of the present invention is not limited to these examples, etc.

Example 1

(1) Production of Substrate

A substrate having three grooves on one surface (see the substrate 3 of FIG. 5) was formed through injection molding of a polycarbonate resin (product name "Panlite AD-5503" available from TEIJIN LIMITED). The substrate has a disk-like shape of a diameter of 12 cm and a thickness of 1.2 mm, and a circular hole having a diameter of 1.5 cm is provided at the center in the plan view to be concentric with the outer circumference. The three grooves are provided at an interval of 0.25 mm to be concentric with the outer circumference of the substrate in the plan view, and the width w1 and depth d1 of each groove are 200 nm. The distance between the groove nearest to the outer circumference of the substrate and the outer circumference of the substrate is 2 cm. As a result of measurement, the arithmetic average roughness (Ra) of the surface of the substrate opposite to the surface formed with the grooves was 120 nm, the transmittance of the testing light (wavelength: 0.63 µm) was 92%, and the haze value was 0.1%.

(2) Preparation of Coating Liquid of Pressure Sensitive Adhesive Composition

A coating liquid of a pressure sensitive adhesive composition having a solid content concentration of about 20 mass % was prepared through adding 1.0 mass parts of a platinum catalyst (product name "PL-50T" available from Shin-Etsu Chemical Co., Ltd.) to 100 mass parts of an addition-type organopolysiloxane comprising an organopolysiloxane having a siloxane bond as the main skeleton and a vinyl group and an organohydrogenpolysiloxane (product name "KS-847H" available from Shin-Etsu Chemical Co., Ltd.), further adding 100 mass parts of a silicone resin component (product name "KR3700" available from Shin-Etsu Chemical Co., Ltd.), and diluting them using methyl ethyl ketone.

(3) Formation of Pre-Etching Pressure Sensitive Adhesive Layer

One surface of a polycarbonate film as the base material (product name "PURE-ACE" available from TEIJIN LIMITED, thickness: 100 µm, arithmetic average roughness (Ra) of surface opposite to surface to be formed with pressure sensitive adhesive layer: 150 nm, transmittance of testing light (wavelength: 0.63 µm): 90% or more, haze value: 0.3% or less) was coated with the coating liquid of the pressure sensitive adhesive composition prepared in the process (2) using a knife coater and the obtained coating film was dried at 120° C. for one minute for curing to form a pressure sensitive adhesive layer having a thickness of 3 µm. Subsequently, the surface of the pressure sensitive adhesive layer opposite to the base material, and the release surface of a release sheet obtained by forming a silicone-based release agent layer on one surface of a polyethylene terephthalate film having a thickness of 38 µm ("SP-PET381031" available from LINTEC Corporation), were attached to each other and a laminate was thus obtained in which the base material, the pre-etching pressure sensitive adhesive layer, and the release sheet were laminated on one another in this order.

The obtained laminate was then cut into the same shape in the plan view as that of the previously-described substrate. Specifically, the laminate was cut into a disk-like shape of a diameter of 12 cm with its center provided with a circular hole of a diameter of 1.5 cm concentric with the outer circumference.

(4) Laser Etching

The release sheet was released from the laminate after being cut and obtained in the above process (3), and a predetermined location of the exposed pre-etching pressure sensitive adhesive layer was irradiated with laser from a position opposite to the base material using an optical system including carbon dioxide laser (wavelength of 9.3 µm) as the light source. Here, the irradiation with laser was performed for a region surrounded by a circle of a diameter of 80.5 mm concentric with the outer circumference in the plan view and a circle of a diameter of 70 mm concentric in the same fashion. Through this irradiation, the pressure sensitive adhesive in that region was removed and a pressure sensitive adhesive absent region was formed in an annular shape in the plan view. A cover film for testing was thus obtained, comprising the pressure sensitive adhesive layer and the base material.

(5) Production of Testing Member

Subsequently, the surface formed with the grooves of the substrate produced in the process (1) and the surface at the pressure sensitive adhesive layer side of the cover film for testing produced in the process (4) were attached to each other. This attaching allowed the three grooves of the substrate to fall within the pressure sensitive adhesive absent region of the cover film for testing in the plan view. A testing member was thus manufactured.

Example 2

(1) Formation of Laser Etching Resistant Layer

An $SiO_2$ layer was formed on one surface of a polycarbonate film as the base material (product name "PURE-ACE" available from TEIJIN LIMITED, thickness: 100 µm, arithmetic average roughness (Ra) of surface opposite to surface to be formed with pressure sensitive adhesive layer: 150 nm, transmittance of testing light (wavelength: 0.63

μm): 90% or more, haze value: 0.3% or less) under the following sputtering condition using a sputtering apparatus (available from ULVAC, Inc.) and a laminate comprising the base material and the laser etching resistant layer was obtained.

Sputtering condition
Target: Si
Film forming gas: Ar, $O_2$
Gas flow rate: Ar; 100 ml/min, $O_2$; 60 ml/min
Film forming pressure: 0.2 Pa
Target power: 2,500 W
Sputtering time: 300 seconds (2) Formation of Pre-Etching Pressure Sensitive Adhesive Layer The surface at the laser etching resistant layer side of the laminate obtained in the process (1) was coated with the coating liquid of the pressure sensitive adhesive composition prepared in the process (2) of Example 1 using a knife coater and the obtained coating film was dried at 120° C. for one minute for curing to form a pressure sensitive adhesive layer having a thickness of 3 μm. Subsequently, the surface of the pressure sensitive adhesive layer opposite to the base material, and the release surface of a release sheet obtained by forming a silicone-based release agent layer on one surface of a polyethylene terephthalate film having a thickness of 38 μm ("SP-PET381031" available from LINTEC Corporation), were attached to each other and a laminate was thus obtained in which the base material, the pre-etching pressure sensitive adhesive layer, and the release sheet were laminated on one another in this order.

The obtained laminate was then cut into the same shape in the plan view as that of the substrate produced in the process (1) of Example 1. Specifically, the laminate was cut into a disk-like shape of a diameter of 12 cm with its center provided with a circular hole of a diameter of 1.5 cm concentric with the outer circumference.

(3) Laser Etching

The laminate after being cut and obtained in the process (2) was used to perform the laser etching in the same manner as in the process (4) of Example 1 and a cover film for testing was thus obtained in which the pressure sensitive adhesive layer, the laser etching resistant layer, and the base material were laminated on one another in this order.

(4) Production of Testing Member

The cover film for testing obtained in the above process (3) was used to manufacture a testing member in the same manner as in the process (5) of Example 1.

Example 3

(1) Printing of Pressure Sensitive Adhesive

A polycarbonate film (product name "PURE-ACE" available from TEIJIN LIMITED, thickness: 100 μm, arithmetic average roughness (Ra) of surface opposite to surface to be formed with pressure sensitive adhesive layer: 150 nm, transmittance of testing light (wavelength: 0.63 μm): 90% or more, haze value: 0.3% or less) was cut into the same shape as that of the substrate produced in the process (1) of Example 1 and used as the base material. Specifically, the polycarbonate film was cut into a disk-like shape of a diameter of 12 cm with its center provided with a circular hole of a diameter of 1.5 cm concentric with the outer circumference.

For one surface of the obtained base material, screen printing was performed using the coating liquid of the pressure sensitive adhesive composition prepared in the process (1) of Example 1. Regions on the base material for the printing were a region outside a circle of a diameter of 80.5 mm concentric with the outer circumference of the base material in the plan view and a region inside a circle of a diameter of 70 mm concentric with the outer circumference of the base material in the plan view. Through this printing, the pressure sensitive adhesive was laminated within the printed regions and a region other than the printed regions was formed with a pressure sensitive adhesive absent region in an annular shape in the plan view. A cover film for testing was thus obtained, comprising the pressure sensitive adhesive layer and the base material.

(2) Production of Testing Member

The cover film for testing obtained in the above process (1) was used to manufacture a testing member in the same manner as in the process (5) of Example 1.

Comparative Example 1

From the laminate of the base material, the pre-etching pressure sensitive adhesive layer, and the release sheet after being cut into the disk-like shape and produced in the process (3) of Example 1, the release sheet was released. The pressure sensitive adhesive surface of the exposed pre-etching pressure sensitive adhesive layer and the surface formed with the grooves of the substrate produced in the process (1) of Example 1 were attached to each other. A testing member was thus manufactured.

<Exemplary Test 1> (Measurement of Arithmetic Average Roughness Ra)

For the cover film for testing produced in each of the examples, the arithmetic average roughness (Ra) of the pressure sensitive adhesive absent region on the surface of the cover film for testing at the pressure sensitive adhesive layer side was measure. First, the cover film for testing was fixed to a glass plate via a double-sided tape so that the surface of the cover film for testing at the base material side would be located at the glass plate side. Then, the arithmetic average roughness (Ra) (nm) of the surface to be measured was measured using a surface roughness meter (product name "SV-3000S4" available from Mitutoyo Corporation, stylus type) in accordance with JIS B0601: 2013. Results are listed in Table 1.

<Exemplary Test 2> (Evaluation of Interfacial Adhesion)

For the testing member manufactured in each of the examples and comparative example, the interfacial adhesion was evaluated in accordance with the criteria below through pressing a finger against the cover film for testing with the substrate fixed and applying force in a planar direction.

○: Dislocation did not occur at the interface between the substrate and the cover film for testing.

x: Dislocation did occur at the interface between the substrate and the cover film for testing.

<Exemplary Test 3> (Evaluation of Invasion of Pressure Sensitive Adhesive into Grooves)

Cross sections of grooves of the testing member manufactured in each of the examples and comparative example were observed using an electron microscope (product name "VE-9800" available from KEYENCE CORPORATION) and evaluation was performed in accordance with the criteria below for the invasion into grooves of the pressure sensitive adhesive constituting the pressure sensitive adhesive layer.

○: Invasion was less than 20% of the cross section of each groove.

x: Invasion was 20% or more of the cross section of each groove.

TABLE 1

| | Presence or absence of pressure sensitive adhesive absent part | Method of forming pressure sensitive adhesive absent part | Presence or absence of laser etching resistant layer | Arithmetic average roughness (Ra) (nm) | Evaluation of interfacial adhesion | Evaluation of invasion of pressure sensitive adhesive into grooves |
|---|---|---|---|---|---|---|
| Example 1 | Present | Laser etching | Absent | 180 | ○ | ○ |
| Example 2 | Present | Laser etching | Present | 30 | ○ | ○ |
| Example 3 | Present | Screen printing | Absent | 150 | ○ | ○ |
| Comparative Example 1 | Absent | — | Absent | — | ○ | x |

As apparent from Table 1, in the testing member produced in each of Examples 1 to 3, the pressure sensitive adhesive does not invade into the grooves.

INDUSTRIAL APPLICABILITY

The cover film for testing and the testing member according to the present invention are suitable for a method of optically measuring a slight amount of a specimen.

DESCRIPTION OF REFERENCE NUMERALS 1, 2 . . . Cover film for testing
10 . . . Base material
20 . . . Pressure sensitive adhesive layer
20' . . . Pre-etching pressure sensitive adhesive layer
30 . . . Pressure sensitive adhesive absent region
40 . . . Laser etching resistant layer
100 . . . Testing member
3 . . . Substrate
5 . . . Groove

The invention claimed is:

1. A cover film for testing comprising:
a base material layer having an entirely flat surface side; and
a patterned pressure sensitive adhesive layer laminated on the entirely flat surface side of the base material layer, wherein
the cover film for testing has an interior adhesive-free region within the entirely flat surface side of the base material layer in which the patterned pressure sensitive adhesive layer does not exist in a plan view, the interior adhesive-free region being surrounded by pressure sensitive adhesive contained within the patterned pressure sensitive adhesive layer,
in a surface of the cover film for testing at the patterned adhesive layer side, an arithmetic average roughness (Ra) of the region in which the patterned adhesive layer does not exist is 0.1 nm or more and 200 nm or less, and
the cover film for testing is configured to
cover and secure a specimen to be tested within at least one groove which extends partially into a substrate having an entirely flat top surface, and
prevent vaporization, leakage, and contamination of a covered and secured specimen to be tested.

2. The cover film for testing as recited in claim 1, wherein the base material layer has transparency to light used in a test.

3. The cover film for testing as recited in claim 1, wherein the base material layer has a thickness of 30 μm or more and 300 μm or less.

4. The cover film for testing as recited in claim 1, further comprising a laser etching resistant layer laminated on a surface of the base material layer at the patterned pressure sensitive adhesive layer side.

5. A method of manufacturing the cover film for testing as recited in claim 1, the method comprising:
a step of laminating a pressure sensitive adhesive on the entirely flat surface side of the base material layer; and
a step of removing a part of the pressure sensitive adhesive by laser etching to form the interior adhesive-free region.

6. A method of manufacturing the cover film for testing as recited in claim 1, the method comprising a step of printing a pressure sensitive adhesive on the entirely flat surface side of the base material layer to form the interior adhesive-free region.

7. The cover film for testing as recited in claim 1, wherein a thickness of the patterned pressure sensitive adhesive layer is 0.5 μm to 20 μm.

8. The cover film for testing as recited in claim 1, wherein an arithmetic average roughness (Ra) on both the entirely flat surface side of the base material layer and another surface side of the base material layer is 200 nm or less.

9. A cover film for testing comprising:
a base material layer having an entirely flat surface side; and
a patterned adhesive layer laminated on the entirely flat surface side of the base material layer, wherein
the cover film for testing has an interior adhesive-free region within the entirely flat surface side of the base material layer in which the patterned adhesive layer does not exist in a plan view, the interior adhesive-free region being surrounded by adhesive contained within the patterned adhesive layer,
in a surface of the cover film for testing at the patterned adhesive layer side, an arithmetic average roughness (Ra) of the region in which the patterned adhesive layer does not exist is 0.1 nm or more and 200 nm or less, and
the cover film for testing is configured to
cover and secure a specimen to be tested within at least one groove which extends partially into a substrate having an entirely flat top surface, and
prevent vaporization, leakage, and contamination of a covered and secured specimen to be tested.

10. A method of manufacturing the cover film for testing as recited in claim 9, the method comprising:
a step of laminating an adhesive on the entirely flat surface side of the base material layer; and
a step of removing at least a part of the adhesive by laser etching to form the interior adhesive-free region.

11. A method of manufacturing the cover film for testing as recited in claim 9, the method comprising a step of printing an adhesive on the entirely flat surface side of the base material layer to form the interior adhesive-free region.

* * * * *